UNITED STATES PATENT OFFICE.

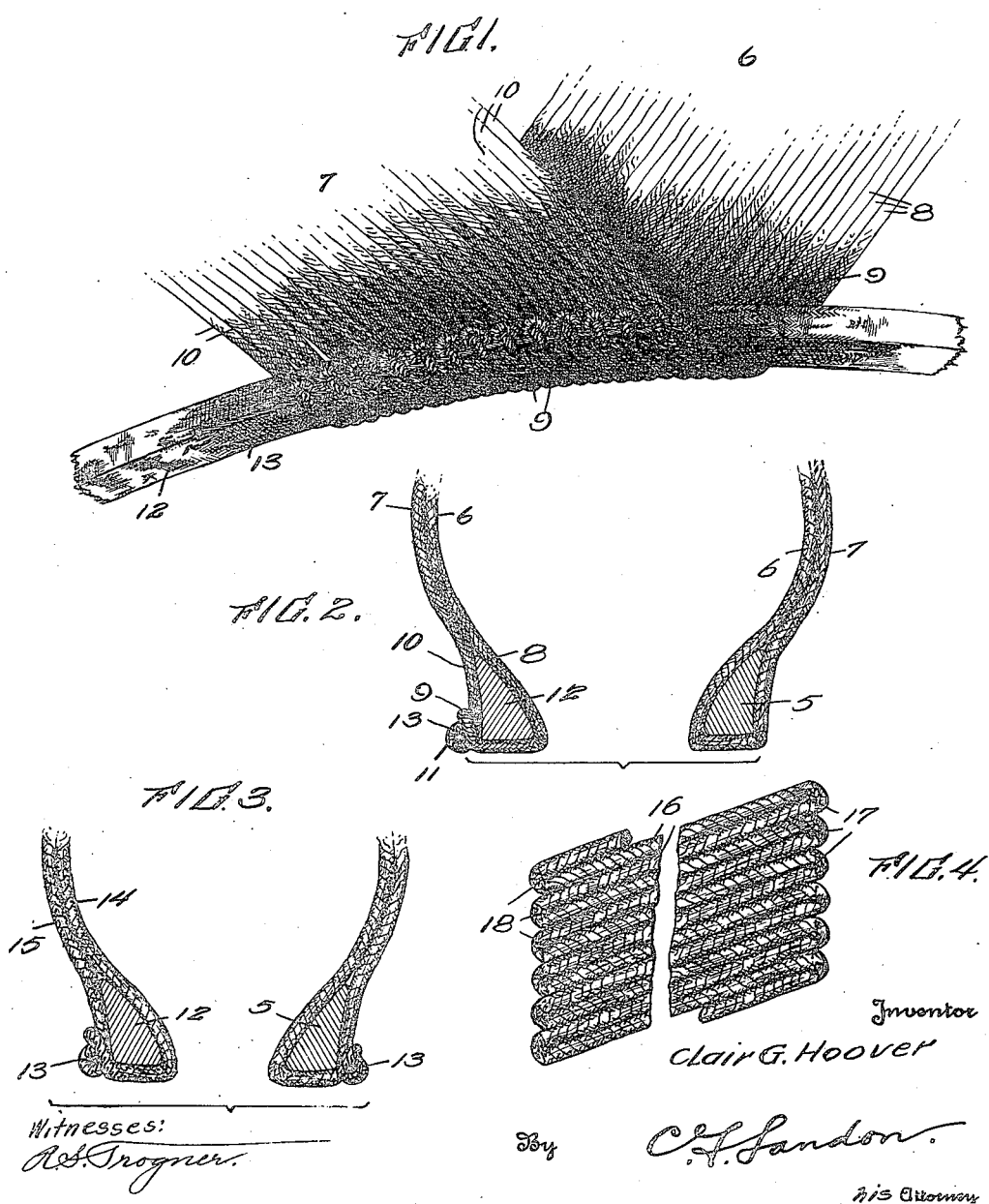

CLAIR G. HOOVER, OF AKRON, OHIO, ASSIGNOR TO THE GOODYEAR TIRE & RUBBER COMPANY, OF AKRON, OHIO, A CORPORATION OF OHIO.

BEAD-ANCHORAGE.

1,320,617.  Specification of Letters Patent.  Patented Nov. 4, 1919.

Application filed February 14, 1918. Serial No. 217,105.

*To all whom it may concern:*

Be it known that I, CLAIR G. HOOVER, residing at Akron, in the county of Summit and State of Ohio, have invented new and useful Improvements in Bead-Anchorage, of which the following is a specification.

My present invention relates broadly to cord tires and has particular reference to a method and means for anchoring the extremities of cords composing the inner reinforcement of a pneumatic vehicle tire shoe about one of the beads of a tire of the type in which the elements comprising the cord blanket are looped over the other of the tire beads.

A popular constructional principle much used by those engaged in the manufacture of that class of pneumatic tires in which the carcass is formed of cords laid in parallelism and crossing the crown of the tire at a 45 degree angle, from bead to bead, has been the laying up of the "cord carcass" as a blanket in which each cord length is doubled back upon itself at the edges of the blanket, which it crosses at the desired bias angle. If the blanket be made of a width equaling twice the distance from bead to bead, over the crown of the tire in cross section, it will be apparent that a single medial folding of the blanket which will juxtapose the edges thereof, will produce a two ply thickness of the flexible reinforcement in which the cords of one ply cross the crown of the tire at a bias angle exactly opposite to that of the cord lengths in the other ply of the same blanket.

Following out this desired result it has frequently been proposed to interpose one bead of the tire at the fold line of the cord blanket, in order that this bead may be suspended from the bight of the folded blanket while the juxtaposed edges of the blanket made up of the loops connecting adjacent lengths of doubled cord, are modified in some way to produce, the opposite bead of the tire.

The usual procedure heretofore has employed split annular wires which are threaded through the loops of cords at the juxtaposed edges of the cord blanket, a pair of wires being used, one for anchoring the individual loops of each ply edge. The main objections to this practice are, first, that plain wires do not make desirable bead elements, being subject to breakage, which circumstance at once causes the destruction of the whole bead and tire, and second, that it is a very difficult matter to properly join by brazing or welding the ends of the split wires after the wires have been inserted in the cord loops. Furthermore, if a regular tire bead be used at the fold line of blanket, as can well be done, the other bead is still irregular and highly undesirable.

It is the principal object of my invention, accordingly, to provide a method and means for so fastening the loop edges of a double cord blanket of the type described, that the use of a regular tire bead will be permitted on both sides of the tire without sacrificing any security of fastening for the juxtaposed edges of the two-ply, folded cord-blanket but, indeed, gaining strength at the beads of the tire.

Another and important object of the invention is to produce in a cord tire of the character in question, a bead construction in which the body of the bead is similar to beads of standard construction and in which the cord looped elements passing around the bead are securely connected to each other and held against accidental displacement from their proper position about the bead body through the use of a single one piece fastening element.

A further object of the invention is to provide a cord anchoring construction at the bead of a tire which will permit the terminal loops of cord lengths of the two plies of the tire to be so interrelated with respect to each other that the space required at the bead for anchoring the juxtaposed edges of the cord blanket is reduced to a minimum. This is an important consideration inasmuch as in the ordinary cord tire construction, the cord lengths must be crowded together at the bead owing to the much shorter annular space afforded at this portion of the tire in comparison to the crown of the tire along which the cords are preferably placed as close as possible.

As a more specific object of the invention, I propose a method of anchoring the juxtoposed edges of the cord blanket about the bead in such a manner that the edge loops of the inner ply are anchorded upon their corresponding edge loops of the outer ply, occupying a minimum of space upon the bead length and rendering necessary the fastening of the outer ply edge loops only.

In the accomplishment of the object of this invention, I preferably double the cord blanket about a regular tire bead core in such a manner that the edge loops of both plies are juxtaposed upon the second tire bead core of regular construction and similar to the first named bead core, each terminal loop of a pair of adjacent cord lengths of the inner ply receiving a similar loop of a pair of the adjacent cord lengths of the outer ply, these outer ply loops being threaded through their corresponding inner ply loops, and being commonly joined by a small annular wire of great strength whose chief purpose and function is to prevent the withdrawal of the outer ply loops from their threaded position with respect to the corresponding inner ply loops.

The above and additional objects of a similar nature, which will be hereinafter more specifically treated, may be accomplished by such means as are illustrated in the accompanying drawings, described in the following specification and then more particularly pointed out in the claims which are appended hereto and form a part of this application.

With reference to the drawing, wherein there has been illustrated a preferred embodiment of the invention as it is reduced to practice, and throughout the several views of which, similar reference numbers designate corresponding parts:

Figure 1 is a side elevational view of the bead anchorage of this invention, showing a portion of the inner ply mated with the corresponding portion of the outer ply of a two-ply cord blanket carcass;

Fig. 2 is a partial cross sectional view of a tire carcass as built up under the teachings of this invention, including a pair of similar and regular tire bead cores;

Fig. 3 is a view similar to Fig. 2 but showing the bead anchorage of this invention employed upon both of the tire toes where two separate plies are used in place of the folded blanket; and Fig. 4 is a plan view of a ply of cords as laid up to furnish the cord loops on both edges of the ply required in construction of the tire in Fig. 3.

The cord blanket which forms the basis of the flexible reinforcement for the whole tire shoe, may be laid up in any desirable manner which provides a finished annular blanket of double the width of the bias distance from bead to bead over the crown of the tire. The cord blanket thus evolved is doubled in such a manner that two plies in annular superposed relation are opposed, this folding of the blanket taking place upon an interposed bead core 5, which is a regular construction, found to be eminently practical and satisfactory in usage.

The bead core 5 is thus supported or located at the back portion of the double blanket which is thus formed in the pair of plies 6 and 7, the cords of which cross each other substantially at right angles and make oblique angles to bead core 5. The ply 6 is here shown as the inner ply, and is comprised of pairs of parallel cord lengths 8, each pair of such cord lengths terminating in connecting loop 9. Similarly the outer ply 7 is composed of pairs of parallel cord lengths 10, which terminate in connecting loop 11.

In accomplishment of the object of this invention, a tire bead core 12 of regular construction and similar to the first named bead core 5 is employed to serve as an anchoring member for the juxtaposed loop edges of the inner and outer plies 6 and 7 of the tire. The pairs of cords 8 of the inner ply are folded about the back and inner sides of the bead core 12 with the loops 9 of these pairs of cords exposed beyond the base of the bead core and open for the reception of the corresponding loops 11 of the pairs of cords of the outer ply 7. This latter ply passes over the outside of the bead 12 and has the terminal edge loops 11 thereof twisted at right angles to the terminal loops 9 of the inner ply and threaded through the respective loops of such inner ply.

When this process has been carried out each pair of cords in the inner ply will be anchored about the bead core 12 and maintained upon the terminal loop of the corresponding pair of cords in the outer ply. An anchoring wire 13 is now threaded through the exposed loops 11 of the outer ply 7, joining all of these loops in an annular series, and thus similarly locking all of the inner ply cord loops 9 in position upon the outer ply loops 11 threaded therethrough.

The tire as now constructed includes in its formation a pair of regular tire bead cores 5 and 12, a desirable result which has not heretofore been accomplished in the construction of tires of this type. The two plies 6 and 7 composing the cord carcass may, or may not, be frictioned with a coat of rubber gum, any desirable finishing process being utilized for completion of the tire.

In any case, the two ply cord tire thus built up about a pair of regular tire bead cores is vulcanized within a mold in the usual manner, this final manufacturing process being capable of uniting the free edges of the main cord blanket firmly upon the bead core 12, the exposed loops 11 of the outer ply cord lengths being flattened out against the outside face of the bead core instead of occupying the exaggerated position of projection illustrated in Fig. 2 mainly for the sake of clearness.

It should be observed that the wire 13 serves merely as a means of preventing the inner ply loops 9 from slipping off the corresponding outer ply edge loops upon which they are respectively anchored and in no sense serves as a bead element of the tire. The strain upon this wire 13 is inconsiderable as the bead core 12 is the main reinforcing element of that toe of the tire. Accordingly, the tire construction thus proposed is not open to the disadvantages of those prior constructions which employed a wire or combination of separate wires exclusively as a bead element and as the anchoring element for the exposed edge loops of the juxtaposed outer and inner plies.

With Fig. 3, I have illustrated a tire built upon the same general principles as that first discussed but composed of two separate plies 14 and 15 instead of the joined plies 6 and 7 compositely forming the main cord blanket. This construction necessitate the anchoring of the superposed cord plies upon each of the bead cores 5 and 12. The anchorage is the same in both instances, the inner ply 14 oppositely embracing the two bead cores as shown in this figure and having threaded through its respective cord loops the corresponding loops of the outer ply 15, upon each of the bead cores in turn. A pair of wires 13 are thus employed.

Each of the separate plies 14 and 15 may be laid up as illustrated in Fig. 4 in which the cord length 16 is successively folded at the points 17 and 18 upon opposite sides of the ply, until the complete annular strip has been laid up to form one of the plies of the finished tire. Both plies will be approximately the same length inasmuch as the outer ply 15 covers a greater distance across the crown of the tire while the inner ply 14 covers a greater distance around its respective bead cores.

What I claim is:

1. A cord tire including outer and inner plies, having juxtaposed edges formed by edge loops connecting each pair of adjacent cord lengths in each of the plies said edge loops of one ply being inserted within the edge loops of the other ply, a bead element interposed between the juxtaposed ply edges and means for retaining the edge loops of one of the plies within the edge loops of the other ply.

2. A cord tire including outer and inner plies formed of cord lengths, the edges of which are formed by loops connecting each pair of adjacent cord lengths, said loops of one ply passing through the loops of the other ply, a bead element interposed between the juxtaposed ply edges and means for locking said loops together.

3. A cord tire including outer and inner plies, formed of cord lengths laid in parallelism from edge to edge of the ply, edge loops at the edge of the outer ply, edge loops at the edge of the inner ply, a bead element interposed between the said inner and outer plies, and means passing through the edge loops of one ply, for fastening the edges of the said inner and outer plies together.

4. A cord tire including a pair of superposed plies, each ply including cord lengths laid in parallelism from edge to edge of the plies, the cord lengths of each pair of adjacent lengths in each ply being connected by integral cord loops at the edges of the ply, the cord lengths of the different plies crossing each other at constant angles, a bead element interposed between juxtaposed edges of the two plies, and a fastening means for the edge loops of one ply which is adapted to be positioned to anchor such loops commonly to the interposed bead element when such loops have been respectively inserted through the corresponding loops of the other ply of the tire.

5. A cord tire including outer and inner plies formed of cord lengths laid in parallelism, the cord lengths of one ply crossing the cord lengths of the other ply at an angle, edge loops at the edge of the outer ply, edge loops at the edge of the inner ply designed to loop over the said edge loops of the outer ply, and means passing through the edge loops of the outer ply whereby the said inner and outer plies are fastened together adjacent their edges.

6. A cord tire including outer and inner plies formed in cord lengths laid in parallelism, the cord lengths of one ply crossing the cord lengths of the other ply at a constant angle, a bead element interposed between the juxtaposed edges of the outer and inner plies, edge loops forming the edge of the outer ply, edge loops forming the edge of the inner ply, and rigid means passing through some of the said edge loops whereby said plies are fastened together at their edges.

In testimony whereof I have signed my name in the presence of two subscribing witnesses.

CLAIR G. HOOVER.

Witnesses:
B. J. McDowel,
R. S. Trogner.